United States Patent
Dyson

(10) Patent No.: US 6,974,488 B2
(45) Date of Patent: Dec. 13, 2005

(54) VACUUM CLEANER

(75) Inventor: James Dyson, Little Somerford (GB)

(73) Assignee: Dyson Limited, Wiltshire (GB)

( * ) Notice: Subject to any disclaimer, the term of this patent is extended or adjusted under 35 U.S.C. 154(b) by 146 days.

(21) Appl. No.: 10/468,304

(22) PCT Filed: Jan. 28, 2002

(86) PCT No.: PCT/GB02/00358

§ 371 (c)(1),
(2), (4) Date: Aug. 20, 2003

(87) PCT Pub. No.: WO02/067757

PCT Pub. Date: Sep. 6, 2002

(65) Prior Publication Data

US 2004/0068827 A1  Apr. 15, 2004

(30) Foreign Application Priority Data

Feb. 24, 2001 (GB) .................................... 0104668
Apr. 12, 2001 (GB) .................................... 0109403

(51) Int. Cl.$^7$ ............................................ B01D 45/16
(52) U.S. Cl. ........................ 55/346; 15/353; 55/DIG. 3
(58) Field of Search ........................ 55/345–349, 337, 55/459.1, DIG. 3; 15/350–353; 95/271; D32/21, D32/22

(56) References Cited

U.S. PATENT DOCUMENTS

| 3,095,369 | A | * | 6/1963 | Jager ....................... 209/139.2 |
|---|---|---|---|---|
| 3,425,192 | A | | 2/1969 | Davis .......................... 55/345 |
| 3,862,041 | A | * | 1/1975 | Robinson .................. 210/512.2 |
| 4,373,228 | A | | 2/1983 | Dyson .......................... 15/350 |
| RE32,257 | E | * | 10/1986 | Dyson .......................... 15/335 |
| 4,820,427 | A | * | 4/1989 | Ryynanen ................... 210/788 |
| 4,927,437 | A | * | 5/1990 | Richerson .................... 55/349 |
| 6,238,451 | B1 | * | 5/2001 | Conrad et al. ................ 55/323 |
| 6,324,723 | B1 | * | 12/2001 | Dodson et al. ............... 15/353 |
| 6,406,505 | B1 | * | 6/2002 | Oh et al. ....................... 55/337 |
| 6,553,612 | B1 | * | 4/2003 | Dyson et al. .............. 15/340.1 |
| D475,820 | S | * | 6/2003 | Dyson et al. ................. D32/22 |
| 6,607,572 | B2 | * | 8/2003 | Gammack et al. ............ 55/343 |
| D484,286 | S | * | 12/2003 | Dyson et al. ................. D32/24 |

FOREIGN PATENT DOCUMENTS

| EP | 0 018 197 A1 | | 10/1980 |
| EP | 0 042 723 B1 | | 8/1985 |
| FR | 2 619 498 A1 | | 2/1989 |
| JP | 52-22176 | * | 2/1977 .................. 55/346 |
| JP | S52-014775 U | | 2/1977 |
| JP | 08 322769 A | | 12/1996 |
| WO | WO 00/04816 | * | 2/2000 |

* cited by examiner

*Primary Examiner*—Richard L. Chiesa
(74) *Attorney, Agent, or Firm*—Morrison & Foerster LLP

(57) ABSTRACT

A vacuum cleaner with an external surface incorporates a cyclonic separating apparatus that includes a plurality of cyclones arranged in parallel with one another. The cyclones each have a tapered body with an outside wall and are arranged so that at least a part of each outside wall forms part of the external surface of the vacuum cleaner.

15 Claims, 4 Drawing Sheets

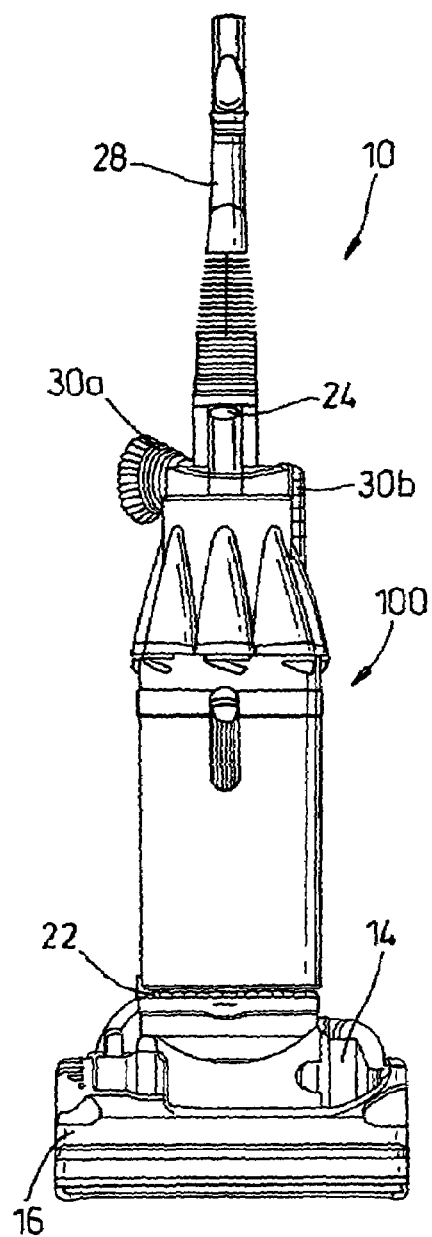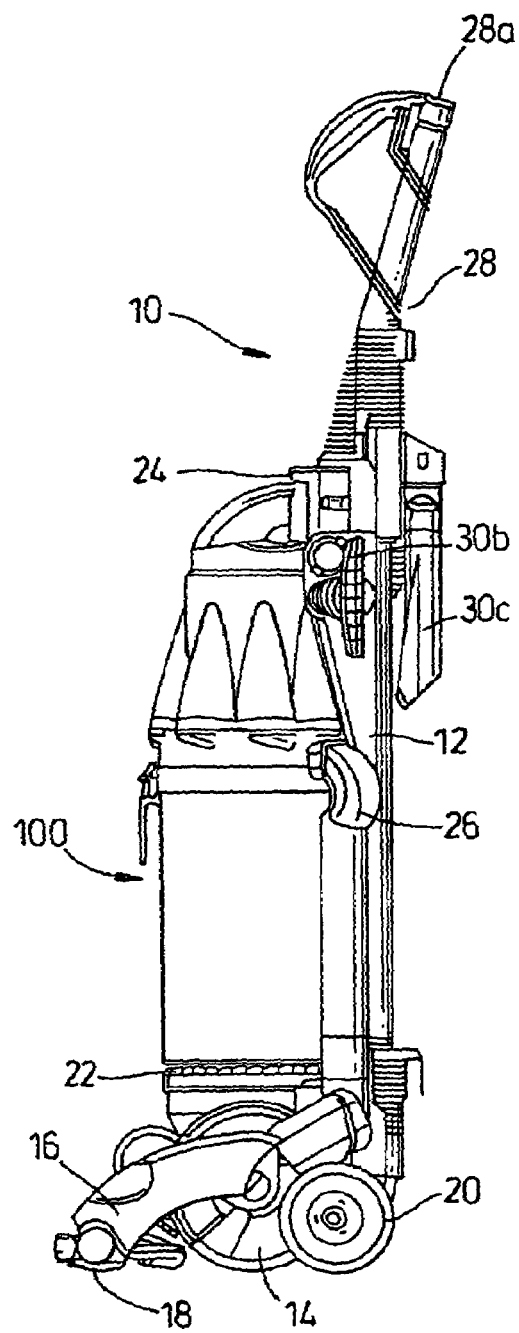
*Fig. 1a*  *Fig. 1b*

VACUUM CLEANER

This is the national stage of International Application No. PCT/GB03/00358, filed Jan. 28, 2002.

FIELD OF THE INVENTION

The invention relates to a vacuum cleaner. Particularly, the invention relates to a vacuum cleaner incorporating cyclonic separating apparatus.

BACKGROUND OF THE INVENTION

Over the last decade or so, the use of cyclonic separating apparatus to separate particles from an airflow in a vacuum cleaner has been developed and introduced to the market. Detailed descriptions of cyclonic separating apparatus for use in vacuum cleaners are given in, inter alia, U.S. Pat. No. 3,425,192, U.S. Pat. No. 4,373,228 and EP 0 042 723. From these and other prior art documents, it can be seen that it is known to provide two cyclone units in series so that the airflow passes sequentially through at least two cyclones. This allows the larger dirt and debris to be extracted from the airflow in the first cyclone, leaving the second cyclone to operate under optimum conditions and so effectively to remove very fine particles in an efficient manner. This type of arrangement has been found to be effective when dealing with airflows in which is entrained a variety of matter having a wide particle size distribution, as is the case in vacuum cleaners.

Some arrangements have been proposed in which the downstream cyclone has been replaced by a plurality of downstream cyclones arranged in parallel. Examples are shown in U.S. Pat. No. 3,425,192 and JP S52-014774. In both of these arrangements, the downstream cyclones are housed within a casing which surrounds the cyclones so that the volume occupied by the cyclones is not minimised.

SUMMARY OF THE INVENTION

The invention provides a vacuum cleaner having an external surface and incorporating cyclonic separating apparatus comprising a plurality of cyclones arranged in parallel to one another, characterised in that each cyclone has a tapering body having an outside wall and in that at least a part of each outside wall forms part of the external surface of the vacuum cleaner.

The incorporation of at least part of the outer walls of the tapering bodies of the cyclones into the external surface of the vacuum cleaner allows the overall volume of the vacuum cleaner to be kept to a minimum. A cover which might otherwise have been provided simply to smooth or streamline the external surface of the vacuum cleaner is not required. Also, the visual effect of being able to see the shape of the functional parts of the cyclonic separating apparatus is pleasing to the consumer and thus desirable. This effect can be enhanced by arranging the cyclones equi-angularly about an axis of the cyclonic separating apparatus and/or by providing that each cyclone has an axis which is inclined towards the axis of the cyclonic separating apparatus.

In a preferred embodiment, the cyclonic separating apparatus comprises at least one further cyclone arranged in parallel to the plurality of cyclones, and the or each further cyclone has a tapering body with an outside wall which does not form part of the external surface of the vacuum cleaner. Hence the number of cyclones arranged in parallel with one another is not limited by the physical limitations of the vacuum cleaner in question. Additional cyclones which do not form part of the external surface of the vacuum cleaner can be placed inside a ring of cyclones which do form part of the external surface of the vacuum cleaner.

In an embodiment, it is an advantage of the present invention to provide cyclonic separating apparatus which occupies a relatively small volume. In an embodiment, it is another advantage of the invention to provide cyclonic separating apparatus suitable for use in vacuum cleaners and capable of ensuring that the size of the vacuum cleaner is as small as possible compared to the prior art. In an embodiment, it is a further advantage of the invention to provided cyclonic separating apparatus capable of mitigating the disadvantages of the prior art.

Other preferred features are set out in the subsidiary claims.

BRIEF DESCRIPTION OF THE DRAWINGS

Embodiments of the invention will now be described with reference to the accompanying drawings, wherein:

FIGS. 1a and 1b are front and side views, respectively, of a vacuum cleaner according to the invention;

FIGS. 3a and 3b are front and sectional side views, respectively, of the cyclonic separating apparatus of FIGS. 2a, 2b and 2c, FIG. 3b being taken along the line III—III of FIG. 3a.

DETAILED DESCRIPTION OF THE DRAWINGS

Figure 2A:
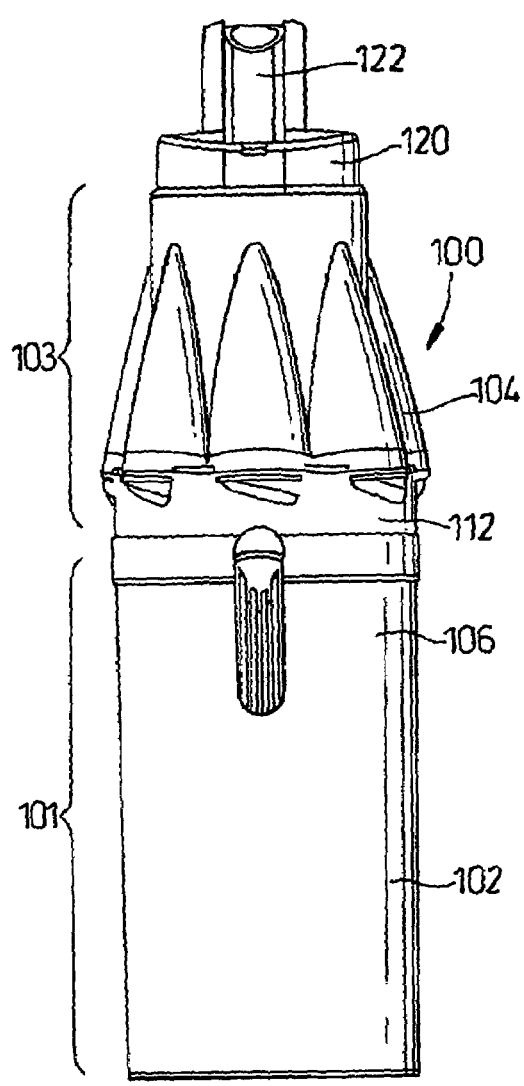
FIGS. 2a, 2b and 2c are front, side and plan views, respectively, of a first embodiment of cyclonic separating apparatus forming part of the vacuum cleaner of FIGS. 1a and 1b.

FIGS. 1a and 1b show a domestic vacuum cleaner 10 according to the present invention. The vacuum cleaner 10 comprises an upstanding body 12 at a lower end of which is located a motor casing 14. A cleaner head 16 is mounted in an articulated fashion on the motor casing 14. A suction inlet 18 is provided in the cleaner head 16 and wheels 20 are rotatably mounted on the motor casing 14 to allow the vacuum cleaner 10 to be manoeuvered over a surface to be cleaned.

Cyclonic separating apparatus 100 is mounted on the upstanding body 12 above the motor casing 14. The cyclonic separating apparatus 100 is seated on a generally horizontal surface formed by a filter cover 22. The filter cover 22 is located above the motor casing 14 and provides a cover for a post-motor filter (not shown). The cyclonic separating apparatus 100 is also secured to the upstanding body 12 by means of a clip 24 located at the top of the cyclonic separating apparatus 100. The upstanding body 12 incorporates upstream ducting (not shown) for carrying dirty air to an inlet of the cyclonic separating apparatus 100 and downstream ducting 26 for carrying cleaned air away from the cyclonic separating apparatus 100.

The upstanding body 12 further incorporates a hose and wand assembly 28 which may be retained in the configuration shown in the drawings so as to function as a handle for manoeuvering the vacuum cleaner 10 over a surface to be cleaned. Alternatively, the hose and wand assembly 28 may be released to allow the distal end 28a of the wand to be used in conjunction with a floor tool (not shown) to perform a cleaning function, eg on stairs, upholstery, etc. The structure and operation of the hose and wand assembly 28 is not material to the present invention and will not be described any further here. The general structure and operation of the hose and wand assembly 28 illustrated in FIGS. 1a and 1b is similar to that described in U.S. Pat. No. Re 32,257 which is incorporated herein by reference. Also, several tools and accessories 30a, 30b, 30c, are releasably mounted on the upstanding body 12 for storage purposes between periods of use.

The precise details of the features of the vacuum cleaner 10 described above are not material to the present invention. The invention is concerned with the details of the cyclonic separation apparatus 100 forming part of the vacuum cleaner 10. In order for the cyclonic separation apparatus 100 to be brought into operation, the motor located in the motor casing 14 is activated so that air is drawn into the vacuum cleaner via either the suction inlet 18 or the distal end 28a of the hose and wand assembly 28. This dirty air (being air having dirt and dust entrained therein) is passed to the cyclonic separation apparatus 100 via the upstream ducting. After the air has passed through the cyclonic separation apparatus 100, it is ducted out of the cyclonic separating apparatus 100 and down the upstanding body 12 to the motor casing 14 via the downstream ducting 26. The cleaned air is used to cool the motor located in the motor casing 14 before being exhausted from the vacuum cleaner 10 via the filter cover 22.

Figure 2B:
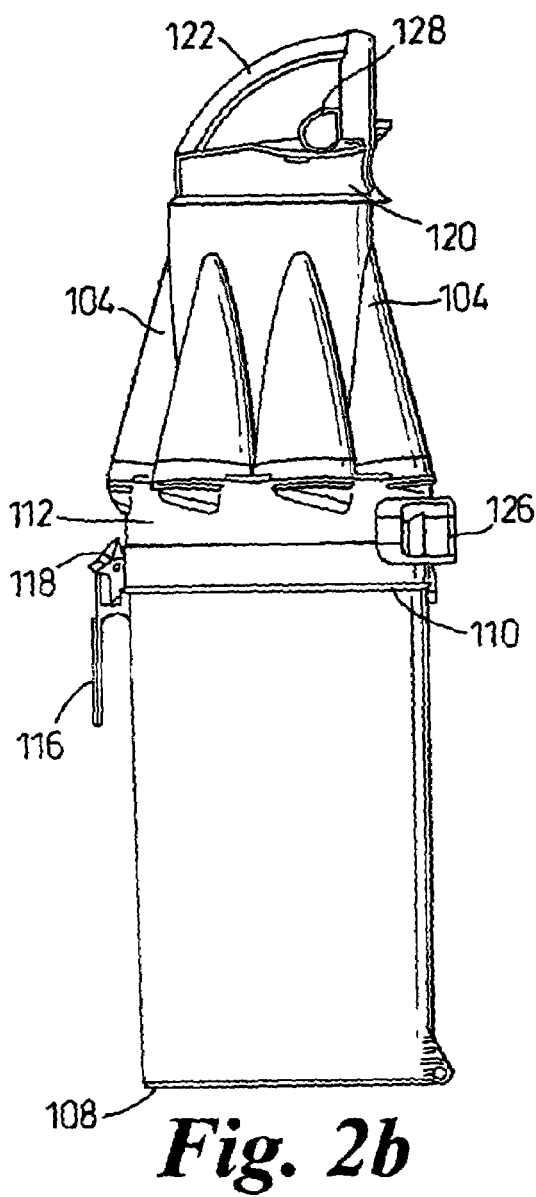
Figure 2C:
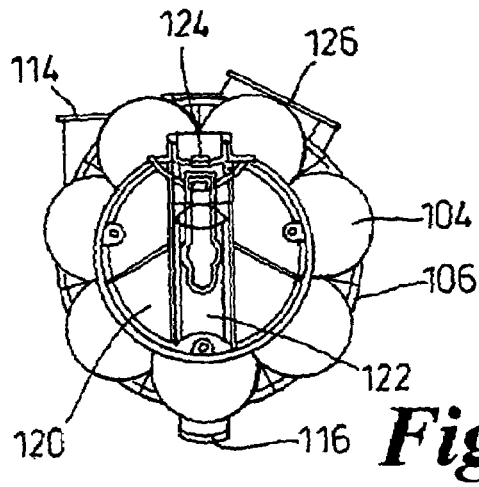

This principle of operation of the vacuum cleaner 10 is known from the prior art. This invention is concerned with the cyclonic separation apparatus 100 which is illustrated in FIGS. 2a, 2b and 2c in isolation from the vacuum cleaner 10.

The cyclonic separation apparatus 100 illustrated in FIG. 2 comprises an upstream cyclone unit 101 consisting of a single upstream cyclone 102 and a downstream cyclone unit 103 consisting of a plurality of downstream cyclones 104. The upstream cyclone 102 consists essentially of a cylindrical bin 106 having a closed base 108. The open upper end 110 of the cylindrical bin abuts against a circular upper moulding 112 which defines an upper end of the upstream cyclone 102. An inlet port 114 is provided in the cylindrical bin 106 in order to allow dirty air to be introduced to the interior of the upstream cyclone 102. The inlet port 114 is shaped, positioned and configured to communicate with the upstream ducting which carries dirt-laden air from the cleaner head 16 to the cyclonic separating apparatus 100. A handle 116 and a catch 118 are provided on the cylindrical bin 106 and the upper moulding 112 respectively in order to provide means for releasing the cylindrical bin 106 from the upper moulding 112 when the cylindrical bin 106 requires to be emptied. A seal (not shown) can be provided between the cylindrical bin 106 and the upper moulding 112 if required.

The base 108 of the cylindrical bin can be hingedly connected to the remainder of the cylindrical bin in order to provide further access to the interior of the cylindrical bin 106 for emptying purposes if required. The embodiment illustrated herein will include a mechanism for allowing the base 108 to be hingedly opened in order to allow emptying, but the details of such a mechanism form the subject of a copending application and will not be described any further here.

Seven identical downstream cyclones 104 are provided in the downstream cyclone unit 103. The downstream cyclones 104 are equi-angularly spaced about the central longitudinal axis 150 of the downstream cyclone unit 103, which is coincident with the longitudinal axis of the upstream cyclone unit 101. The arrangement is illustrated in FIG. 2c.

Each downstream cyclone 104 is frusto-conical in shape with the larger end thereof located lowermost and the smaller end uppermost. Each downstream cyclone 104 has a longitudinal axis 148 (see FIG. 3b) which is inclined slightly towards the longitudinal axis 150 of the downstream cyclone unit 103. This feature will be described in more detail below. Also, the outermost point of the lowermost end of each downstream cyclone 104 extends radially further from the longitudinal axis 150 of the downstream cyclone unit 103 than the wall of the cylindrical bin 106. The uppermost ends of the downstream cyclones 104 project inside a collection moulding 120 which extends upwardly from the surfaces of the downstream cyclones 104. The collection moulding 120 supports a handle 122 by means of which the entire cyclonic separation apparatus 100 can be transported. A catch 124 is provided on the handle 122 for the purposes of securing the cyclonic separation apparatus 100 to the upstanding body 12 at the upper end thereof. An outlet port 126 is provided in the upper moulding 112 for conducting cleaned air out of the cyclonic separating apparatus 100. The outlet port 126 is arranged and configured to co-operate with the downstream ducting 26 for carrying the cleaned air to the motor casing 14.

Figure 4B:
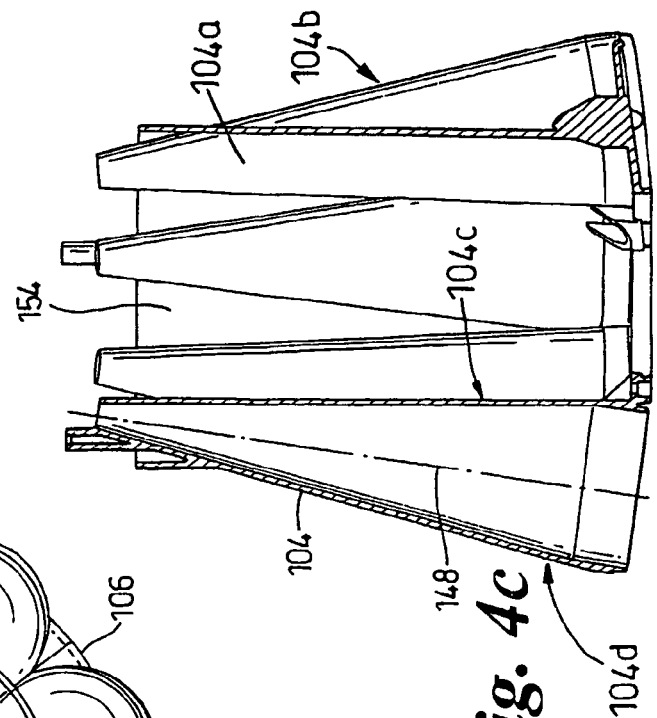
FIGS. 4a, 4b and 4c are perspective, plan and sectional side views, respectively, of a portion of the cyclonic separating apparatus of FIGS. 2a, 2b and 2c, FIG. 4c being taken along line IV—IV of FIG. 4b.
Figure 4C:
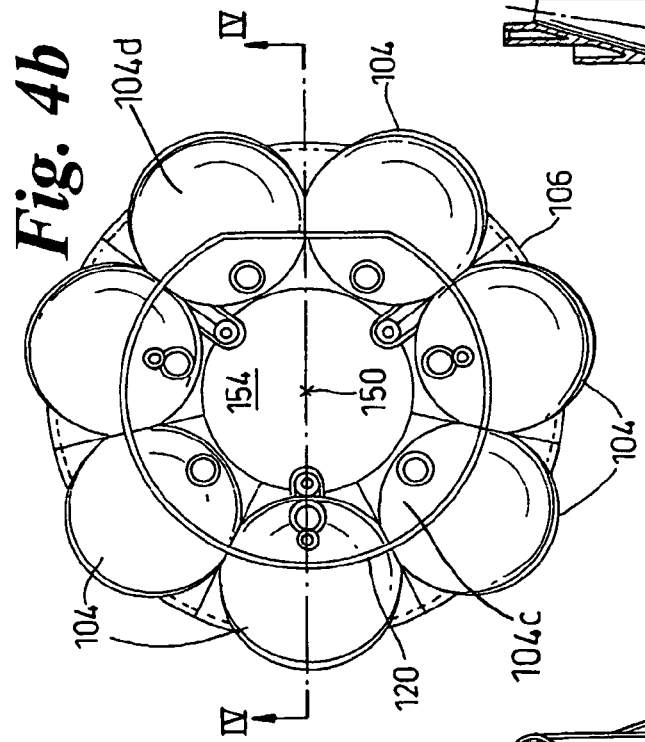
Figure 4A:
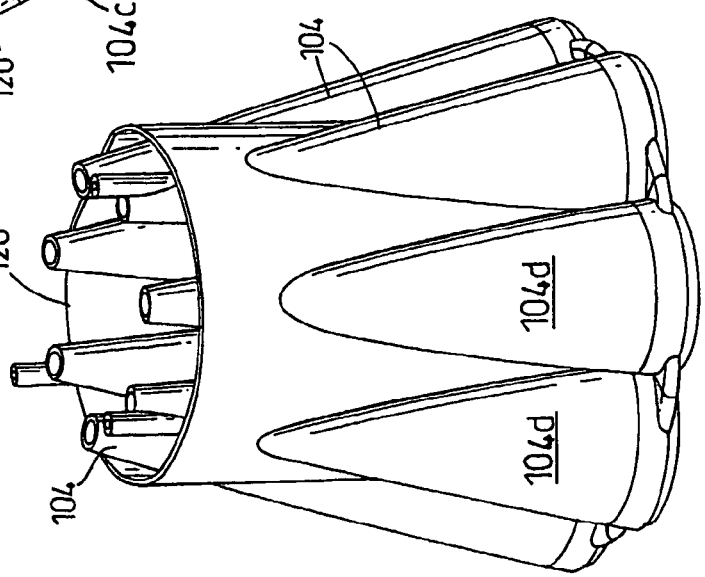

As can be seen from FIGS. 4a and 4b, each cyclone 104 has a tapering body 104a which is frusto-conical in shape. Each cyclone 104 has an outer wall 104b. A first portion 104c of the outer wall 104b is located inside the collection moulding 120 whilst a further portion 104d is located outside the collection moulding 120. The portion 104d of each outer wall 104b located outside the collection moulding 120 forms part of the external surface of the vacuum cleaner, as can clearly be seen from FIGS. 1a and 1b.

The collection moulding 120 also carries an actuating lever 128 designed to activate a mechanism for opening the base 108 of the cylindrical bin 106 for emptying purposes as mentioned above.

Figure 3A:
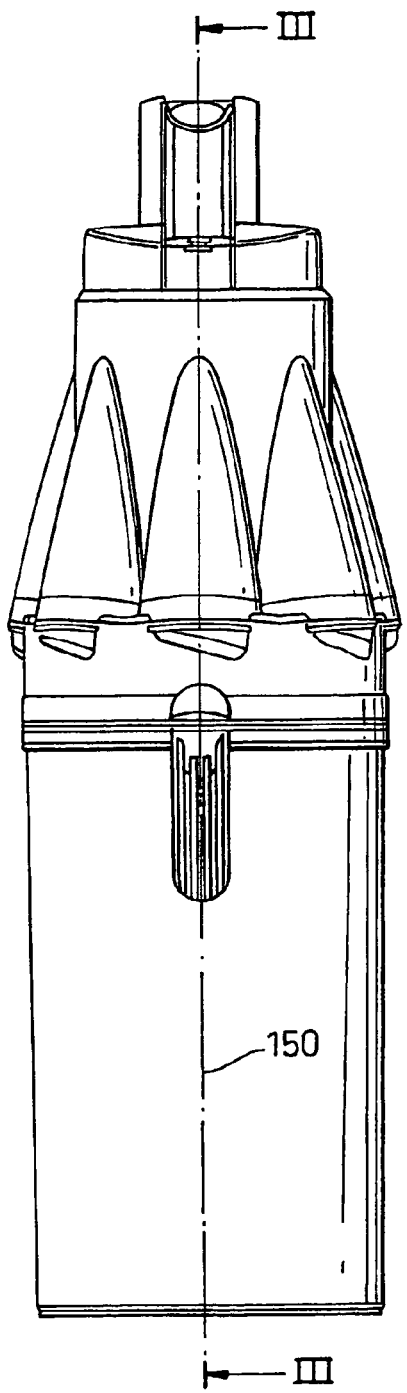
Figure 3B:
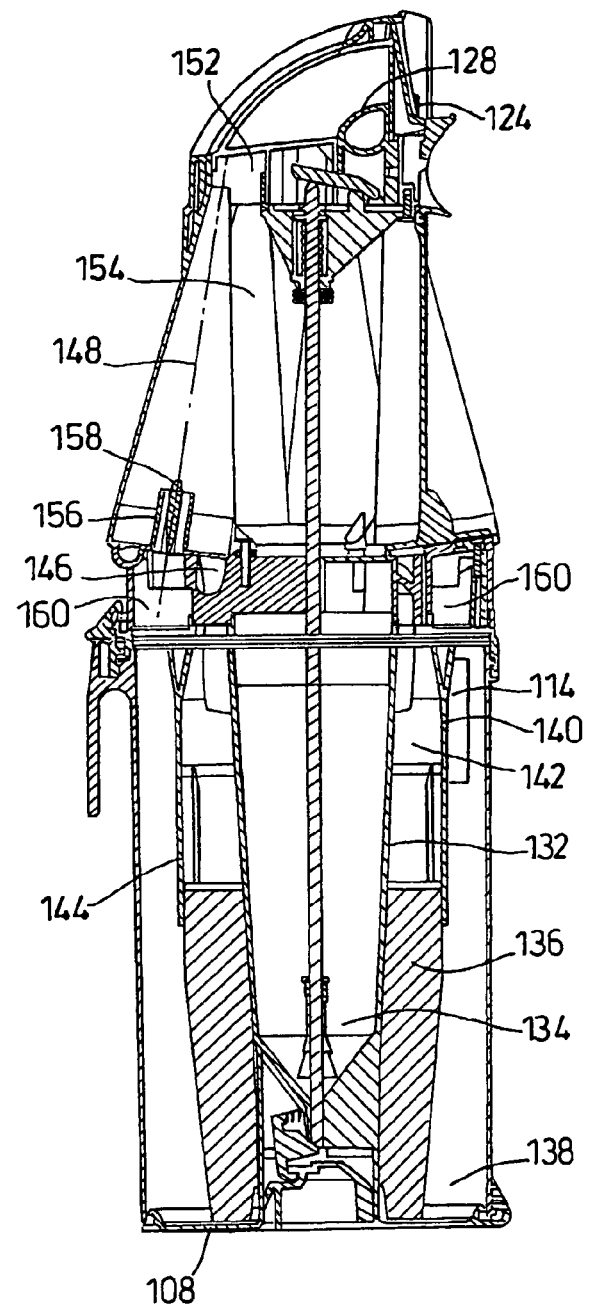

The internal features of the cyclonic separating apparatus 100 will now be described with reference to FIG. 3b. FIG. 3a corresponds to FIG. 2a and indicates the line III—III on which the section of FIG. 3b is taken.

The internal features of the upstream cyclone 102 include an internal wall 132 extending the entire length thereof. The internal space defined by the internal wall 132 communicates with the interior of the collection moulding 120 as will be described below. The purpose of the internal wall 132 is to define a collection space 134 for fine dust. Located inside the internal wall 132 and in the collection space 134 are components for allowing the base 108 to open when the actuating lever 128 is actuated. The precise details and operation of these components is immaterial to the present invention and will not be described any further here.

Mounted externally of the internal wall 132 are four equi-spaced baffles or fins 136 which project radially outwardly from the internal wall 132 towards the cylindrical bin 106. These baffles 136 assist with the deposition of large dirt and dust particles in the collection space 138 defined between the internal wall 132 and the cylindrical bin 106 adjacent the base 108. The particular features of the baffles 136 are described in more detail in WO 00/04816.

Located outwardly of the internal wall 132 in an upper portion of the upstream cyclone 102 is a shroud 140. The shroud extends upwardly from the baffles 136 and, together with the internal wall 132, defines an air passageway 142. The shroud 140 has a perforated portion 144 allowing air to pass from the interior of the upstream cyclone 102 to the air passageway 142. The air passageway 142 communicates with the inlet 146 of each of the downstream cyclones 104.

Each inlet 146 is arranged in the manner of a scroll so that air entering each downstream cyclone 104 is forced to follow a helical path within the respective downstream cyclone 104.

As previously mentioned, the longitudinal axis 148 of each downstream cyclone 104 is inclined towards the longitudinal axis 150 of the downstream cyclone unit 103. The upper end of each downstream cyclone 104 is closer to the longitudinal axis 150 than the lower end thereof. In this embodiment, the angle of inclination of the relevant axes 148 is substantially 7.5°.

The upper ends of the downstream cyclones 104 project inside the collection moulding 120, as previously mentioned. The interior of the collection moulding 120 defines a chamber 152 with which the upper ends of the downstream cyclones 104 communicate. The collection moulding 120 and the surfaces of the downstream cyclones 104 together define an axially extending passageway 154, located between the downstream cyclones 104, which communicates with the collection space 134 defined by the internal wall 132. It is thus possible for dirt and dust which exits the smaller ends of the downstream cyclones 104 to pass from the chamber 152 to the collection space 134 via the passageway 154.

Each downstream cyclone 104 has an air exit in the form of a vortex finder 156. Each vortex finder 156 is located centrally of the lowermost end of the respective downstream cyclone 104, as is the norm. In this embodiment, a centre body 158 is located in each vortex finder 156. Each vortex finder communicates with an annular chamber 160 which, in turn, communicates with the outlet port 126 (see FIG. 2c).

FIGS. 4a, 4b and 4c illustrate the arrangement of the downstream cyclones 104 in greater detail. In particular, this helps to illustrate the configuration of the passageway 154. FIG. 4b also helps to illustrate the fact that the side of each of the downstream cyclones 104 closest to the longitudinal axis of the downstream cyclone unit 103 lies substantially parallel thereto.

FIGS. 4a, 4b and 4c also illustrate the fact that each of the seven downstream cyclones 104 is moulded integrally with the remaining six cyclones 104 in a single part. The moulding illustrated in FIGS. 4a, 4b and 4c can be and is manufactured as a single part and this has advantages from the manufacturing and assembly point of view. Specifically, the cost of manufacturing this arrangement as a single part is cheaper than the cost of manufacturing the cyclones individually and assembling them together into the required configuration. Furthermore, the risk of errors occurring in the assembly procedure is eliminated by manufacturing the cyclones as a single unit. If the cyclones were manufactured separately and subsequently assembled, the risk of pressure inequalities occurring in the system would be increased and this could affect the separation performance of the cyclone assembly as a whole.

The mode of operation of the apparatus described above is as follows. Dirty air (being air in which dirt and dust is entrained) enters the cyclonic separating apparatus 100 via the inlet port 114. The arrangement of the inlet port 114 is essentially tangential to the wall of the cylindrical bin 106 which causes the incoming air to follow a helical path around the inside of the cylindrical bin 106. Larger dirt and dust particles, along with fluff and other large debris, are deposited in the collection space 138 adjacent the base 108 by virtue of the effect of centrifugal forces acting on the particles, as is well known. Partially cleaned air travels inwardly and upwardly away from the base 108, exiting the upstream cyclone 102 via the perforated portion 144 of the shroud 140. The partially-cleaned air then moves along the air passageway 142 in which it is divided into seven portions. Each portion enters one of the downstream cyclones 104 via the respective inlet 146. As has been mentioned above, each inlet 146 is a scroll inlet which forces the incoming air to follow a helical path inside the downstream cyclone 104. The tapering shape of the downstream cyclone 104 causes further, intense cyclonic separation to take place inside the downstream cyclone 104 so that very fine dirt and dust particles are separated from the main airflow. The dirt and dust particles exit the uppermost end of the downstream cyclone 104 whilst the cleaned air returns to the lower end of the downstream cyclone 104 along the axis 148 thereof and exits via the vortex finder 156. The cleaned air passes from the vortex finder 156 into the annular chamber 162 and from there to the outlet port 126. Meanwhile, the dirt and dust which has been separated from the airflow in the downstream cyclone 104 falls from the chamber 152 through the passage way 154 to the collection space 134.

When it is desired to empty the cyclonic separating apparatus 100, the base 108 can be hingedly released from the sidewall of the cylindrical bin 106 so that the dirt and debris collected in collection spaces 134 and 138 can be allowed to drop into an appropriate receptacle. As previously explained, the detailed operation of the emptying mechanism does not form part of the present invention and will not be described any further here.

The invention is not limited to the precise details of the embodiments described above. It must be stressed that the features of the vacuum cleaner external to the cyclonic cleaning apparatus are immaterial to the invention. It will be appreciated that there is no particular need for the apparatus to be arranged so that the axes of the cyclone units are vertical and the axes may indeed be inclined to the vertical or even horizontal if desired. The fact that centrifugal separation is not greatly affected by gravity makes this possible as long as the collecting areas of the cyclone units are arranged to collect the debris without interference to the airflow paths necessary to effect separation. In a further variation to the embodiments described in detail above, the downstream cyclones illustrated above may be arranged so that their respective axes are arranged parallel to one another instead of being inclined towards the axis of the downstream cyclone unit as shown in the drawings. Furthermore, as has been mentioned above, additional downstream cyclones may be provided in parallel to those illustrated in the embodiment described above. This can be achieved by increasing the number of cyclones spaced equi-angularly about the axis of the cyclonic separating apparatus, by adding additional cyclones inside the ring of cyclones already provided, or by a combination of both of these. Other variations and modifications will be apparent to a skilled reader.

What is claimed is:

1. A vacuum cleaner, comprising a body having an external surface, a suction inlet on the body for conveying dirty air from outside the vacuum cleaner into the body and a motor configured to draw the dirty air into the body through the suction inlet, the body comprising a plurality of cyclones arranged in parallel to one another, each cyclone including a tapering body having an outside wall, wherein at least a part of each outside wall forms part of the external surface of the vacuum cleaner.

2. A vacuum cleaner as claimed in claim 1, wherein the cyclones are equi-angularly arranged about an axis of the cyclonic separating apparatus.

3. A vacuum cleaner having an external surface and incorporating cyclonic separating apparatus comprising a plurality of cyclones arranged in parallel to one another, each cyclone including a tapering body having an outside wall, wherein at least a part of each outside wall forms part of the external surface of the vacuum cleaner, wherein the cyclones are equi-angularly arranged about an axis of the cyclonic separating apparatus, and wherein each cyclone has an axis which is inclined towards the axis of the cyclonic separating apparatus.

4. A vacuum cleaner as claimed in claim 3, wherein the cyclonic separating apparatus comprises at least one further cyclone arranged in parallel to the plurality of cyclones, the further cyclone having a tapering body with an outside wall which does not form a part of the external surface of the vacuum cleaner.

5. A vacuum cleaner as claimed in claim 4, wherein the further cyclone is arranged closer to the axis of the cyclonic separating apparatus than the plurality of cyclones.

6. A vacuum cleaner as claimed in claim 1, 2 or 3, wherein each tapering body is frusto-conical in shape.

7. A vacuum cleaner as claimed in claim 1, 2 or 3, wherein all of the cyclones are substantially the same size and shape.

8. A vacuum cleaner as claimed in claim 3, wherein the cyclonic separating apparatus comprises an upstream cyclone having an outer wall, at least a part of which forms a part of the external surface of the vacuum cleaner.

9. A vacuum cleaner as claimed in claim 8, wherein the outer wall of the upstream cyclone is substantially cylindrical in shape.

10. A vacuum cleaner as claimed in claim 9, wherein the plurality of cyclones arranged in parallel to one another are located wholly outside the outer wall of the upstream cyclone.

11. A vacuum cleaner as claimed in claim 1 or 2, further comprising at least one further cyclone arranged in parallel to the plurality of cyclones, the further cyclone having a tapering body with an outside wall which does not form a part of the external surface of the vacuum cleaner.

12. A vacuum cleaner as claimed in claim 11, wherein the further cyclone is arranged closer to the axis of the cyclonic separating apparatus than the plurality of cyclones.

13. A vacuum cleaner as claimed in claim 1 or 2, further comprising an upstream cyclone having an outer wall, at least a part of which forms a part of the external surface of the vacuum cleaner.

14. A vacuum cleaner having an external surface and incorporating cyclonic separating apparatus comprising a plurality of cyclones arranged in parallel to one another, each cyclone including a tapering body having an outside wall, wherein at least a part of each outside wall forms part of the external surface of the vacuum cleaner, wherein each cyclone has a lower end and an upper end, and wherein the lower end is larger than the upper end.

15. A vacuum cleaner as claimed in claim 14, wherein the upper end of each cyclone opens into a common collection area.

\* \* \* \* \*